(12) United States Patent
Su et al.

(10) Patent No.: US 11,683,732 B2
(45) Date of Patent: *Jun. 20, 2023

(54) TRANSMISSION OPPORTUNITY CONTROL METHOD AND APPARATUS

(71) Applicant: HUAWEI TECHNOLOGIES CO., LTD., Shenzhen (CN)

(72) Inventors: Hongjia Su, Shanghai (CN); Jun Zhu, Shenzhen (CN); Yingpei Lin, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/842,792

(22) Filed: Apr. 8, 2020

(65) Prior Publication Data

US 2020/0236597 A1 Jul. 23, 2020

Related U.S. Application Data (63) Continuation of application No. 16/019,569, filed on Jun. 27, 2018, now Pat. No. 10,638,384, which is a (Continued)

(30) Foreign Application Priority Data

Dec. 28, 2015 (CN) .......................... 201511003316.7

(51) Int. Cl.
*H04W 36/00* (2009.01)
*H04W 36/08* (2009.01)
(Continued)

(52) U.S. Cl.
CPC ....... *H04W 36/0077* (2013.01); *H04W 36/08* (2013.01); *H04W 36/34* (2013.01); (Continued)

(58) Field of Classification Search
CPC . H04W 36/08; H04W 36/34; H04W 36/0077; H04W 72/0446; H04W 74/04; (Continued)

(56) References Cited

U.S. PATENT DOCUMENTS 6,785,283 B1 8/2004 Stichter
7,639,658 B2 12/2009 Frederiks et al.
(Continued)

FOREIGN PATENT DOCUMENTS

CN 1780246 A 5/2006
CN 103298027 A 9/2013
(Continued)

*Primary Examiner* — Phong La
(74) *Attorney, Agent, or Firm* — Rimon PC (57) ABSTRACT

In various embodiments, an access point sends a first frame. The first frame carries a TXOP handover enforcement THE indication field which is a first value or a second value. The first value instructs a station that has accessed a channel to hand over a held TXOP to the access point, and the second value instructs the station that has accessed the channel to hand over the held TXOP to the access point when a handover condition is satisfied. It can be learned that the STA hands over the held TXOP to the AP. Therefore, the AP may be a TXOP holder through the TXOP handover even if the AP fails to obtain the channel through contention, so that a probability of holding the TXOP by the AP is improved, a probability of scheduling a STA by the AP is improved, and system resource utilization is improved.

16 Claims, 9 Drawing Sheets

Related U.S. Application Data continuation of application No. PCT/CN2016/107093, filed on Nov. 24, 2016.

(51) Int. Cl.
  *H04W 36/34* (2009.01)
  *H04W 74/08* (2009.01)
  *H04W 72/0446* (2023.01)
  *H04W 74/04* (2009.01)
  *H04W 84/12* (2009.01)

(52) U.S. Cl.
  CPC ....... *H04W 72/0446* (2013.01); *H04W 74/04* (2013.01); *H04W 74/08* (2013.01); *H04W 84/12* (2013.01)

(58) Field of Classification Search
  CPC . H04W 74/08; H04W 84/12; H04W 36/0072; H04W 36/006; H04W 36/0058; H04W 36/10; H04W 36/12
  See application file for complete search history.

(56) References Cited

U.S. PATENT DOCUMENTS

| | | |
|---|---|---|
| 2006/0114878 A1 | 6/2006 | Choe et al. |
| 2006/0171341 A1 | 8/2006 | Wang et al. |
| 2007/0248117 A1 | 10/2007 | Zuniga et al. |
| 2010/0061342 A1* | 3/2010 | Frederiks ............... H04W 74/02 370/331 |
| 2011/0044287 A1* | 2/2011 | Park ................... H04W 36/0077 370/331 |
| 2012/0224521 A1* | 9/2012 | Zhu ....................... H04B 7/0452 370/311 |
| 2014/0181293 A1 | 6/2014 | Bhanage et al. |
| 2015/0009814 A1 | 1/2015 | Wu et al. |
| 2015/0055546 A1 | 2/2015 | Jafarian et al. |
| 2015/0063251 A1 | 3/2015 | Asterjadhi |
| 2015/0071051 A1 | 3/2015 | Zhu et al. |
| 2015/0181620 A1 | 6/2015 | Seok |
| 2015/0208308 A1* | 7/2015 | Watanabe ......... H04W 36/0088 455/436 |
| 2015/0359008 A1* | 12/2015 | Wang ................... H04W 74/004 370/330 |
| 2016/0345362 A1* | 11/2016 | Lee ................... H04W 74/0816 |
| 2017/0273140 A1* | 9/2017 | Ryu ................... H04W 74/004 |
| 2018/0288743 A1* | 10/2018 | Choi ................ H04W 74/0833 |

FOREIGN PATENT DOCUMENTS

| | | |
|---|---|---|
| CN | 104488347 A | 4/2015 |
| EP | 2863699 A1 | 4/2015 |
| WO | 2006102294 A2 | 9/2006 |

\* cited by examiner

TRANSMISSION OPPORTUNITY CONTROL METHOD AND APPARATUS

CROSS-REFERENCE TO RELATED APPLICATIONS

This application is a continuation of U.S. patent application Ser. No. 16/019,569, filed on Jun. 27, 2018, which is a continuation of International Patent Application No. PCT/CN2016/107093, filed on Nov. 24, 2016, which claims priority to Chinese Patent Application No. 201511003316.7, filed on Dec. 28, 2015. All of the afore-mentioned patent applications are hereby incorporated by reference in their entireties.

TECHNICAL FIELD

This application relates to the communications field, and in particular, to a transmission opportunity control method and an apparatus.

BACKGROUND

Devices in a wireless local area network (Wireless Local Area Network, WLAN) need to contend for a right of use of a channel resource, that is, to be a transmission opportunity (Transmission Opportunity, TXOP) holder. Currently, an access point (Access Point, AP) and a non-access point station (Non-Access Point Station, STA for short) have equal contention opportunities.

In the 802.11ax to which an OFDMA technology is introduced, the AP may perform uplink and downlink transmission scheduling for different STAs on different time-frequency resources, so as to improve system resource utilization.

However, when a relatively large quantity of user equipments access a network, contention is relatively strong, and therefore a probability of successfully contending for a channel by the AP is relatively low. If the AP cannot be a TXOP holder, multi-user scheduling transmission cannot be performed, and consequently resource utilization is difficult to improve.

SUMMARY

This application provides a transmission opportunity control method and an apparatus, so as to improve an opportunity of an AP to be a TXOP holder, and improve resource utilization of a WLAN system.

To achieve the foregoing objective, this application provides the following technical solutions:

A first aspect of this application provides a transmission opportunity control method, including: sending, by an access point, a first frame, where the first frame carries a TXOP handover enforcement THE indication field, the THE indication field is a first value or a second value, the first value instructs a station that has accessed a channel to hand over a held TXOP to the access point, and the second value instructs the station that has accessed the channel to hand over the held TXOP to the access point when a handover condition is satisfied. In the method in the first aspect, the STA hands over the TXOP to the AP, so that a probability of scheduling a STA by the AP is improved, and resource utilization is improved.

A second aspect of this application provides an access point, including: a first transmitter, configured to send a first frame, where the first frame carries a TXOP handover enforcement THE indication field, the THE indication field is a first value or a second value, the first value instructs a station that has accessed a channel to hand over a held TXOP to the access point, and the second value instructs the station that has accessed the channel to hand over the held TXOP to the access point when a handover condition is satisfied.

In an implementation of the first aspect and the second aspect, the THE indication field is the first value, or the THE indication field is the second value and the station that has accessed the channel satisfies the handover condition; and the method further includes: receiving, by the access point, a second frame sent by the station that has accessed the channel, where the second frame instructs to hand over the TXOP to the access point.

In another implementation of the first aspect and the second aspect, the handover condition includes that a time used by the station to obtain the channel through contention is greater than a handover threshold, where the handover threshold is a contention time that is provided by the access point for the station and that is used to contend for the channel, and the handover threshold is determined by the access point based on a network status, and is sent to the station.

A third aspect of this application provides a transmission opportunity control method, including: receiving, by an access point, a third frame, where the third frame carries first duration and a TXOP transfer grant TTG field, and the first duration is determined by a station that has accessed a channel based on a TXOP held by the station; and when the TTG field is a third value, sending, by the access point, a fourth frame to the station that has accessed the channel, where the fourth frame carries second duration, the second duration is determined based on a TXOP requested by the access point, the second duration is longer than the first duration, and the TXOP requested by the access point is obtained by extending the TXOP held by the station by a preset time. In the method provided in the third aspect, after transmission is completed during a TXOP 1 held by the STA, the AP can hold a TXOP 2, so that resource utilization can be improved.

A fourth aspect of this application provides an access point, including: a second receiver, configured to receive a third frame, where the third frame carries first duration and a TXOP transfer grant TTG field, and the first duration is determined by a station that has accessed a channel based on a TXOP held by the station; and a second transmitter, configured to: when the TTG field is a third value, send a fourth frame to the station that has accessed the channel, where the fourth frame carries second duration, the second duration is determined based on a TXOP requested by the access point, the second duration is longer than the first duration, and the TXOP requested by the access point is obtained by extending the TXOP held by the station by a preset time.

In an implementation of the third aspect and the fourth aspect, the method further includes: when the TTG field is a fourth value, sending, by the access point, a fifth frame carrying the first duration.

In an implementation of the third aspect and the fourth aspect, after the sending, by the access point, a fourth frame to the station that has accessed the channel, the method further includes: holding, by the access point, the TXOP requested by the access point.

In an implementation of the third aspect and the fourth aspect, after the sending, by the access point, a fourth frame to the station that has accessed the channel, the method further includes: receiving, by the access point, a contention free end CF-End-X frame sent by the station that has accessed the channel, where the CF-End-X frame carries the second duration, and the CF-End-X frame is used to indicate that data transmission of the station that has accessed the channel during the first duration ends; and holding, by the access point, the TXOP requested by the access point.

A fifth aspect of this application provides a transmission opportunity control method, including: receiving, by a station, a first frame sent by an access point, where the first frame carries a TXOP handover enforcement THE indication field; and when the THE indication field is a first value, sending, by the station, a second frame to the access point, where information of the second frame instructs to hand over a TXOP to the access point.

A sixth aspect of this application provides a station, including: a third receiver, configured to receive a first frame sent by an access point, where the first frame carries a TXOP handover enforcement THE indication field; and a third transmitter, configured to: when the THE indication field is a first value, send a second frame to the access point, where information of the second frame instructs to hand over a TXOP to the access point.

In an implementation of the fifth aspect and the sixth aspect, the method further includes: when the THE indication field is a second value, determining, by the station, whether a handover condition is satisfied, and if the handover condition is satisfied, sending, by the station, the Second frame to the access point.

In an implementation of the fifth aspect and the sixth aspect, the handover condition includes:

a time used by the station to obtain the channel through contention is greater than a handover threshold, where the handover threshold is a contention time that is provided by the access point for the station and that is used to contend for the channel.

A seventh aspect of this application provides a transmission opportunity control method, including: sending, by a station, a third frame to an access point, where the third frame carries first duration and a TTG field, the first duration is determined by the station based on a TXOP held by the station, the TTG field is a third value or a fourth value, the third value is used to indicate that TXOP handover is allowed, and the fourth value is used to indicate that TXOP handover is not allowed; and receiving, by the station, a fourth frame or a fifth frame sent by the access point, where the fourth frame carries second duration, the second duration is determined based on a TXOP requested by the access point, the second duration is longer than the first duration, the TXOP requested by the access point is obtained by extending the TXOP held by the station by a preset time, and the fifth frame carries the first duration.

An eighth aspect of this application provides a station, including: a fourth transmitter, configured to send a third frame to an access point, where the third frame carries first duration and a TTG field, the first duration is determined by the station based on a TXOP held by the station, the TTG field is a third value or a fourth value, the third value is used to indicate that TXOP handover is allowed, and the fourth value is used to indicate that TXOP handover is not allowed; and a fourth receiver, configured to receive a fourth frame or a fifth frame sent by the access point, where the fourth frame carries second duration, the second duration is determined based on a TXOP requested by the access point, the second duration is longer than the first duration, the TXOP requested by the access point is obtained by extending the TXOP held by the station by a preset time, and the fifth frame carries the first duration.

In an implementation of the seventh aspect and the eighth aspect, the receiving, by the station, a fourth frame or a fifth frame sent by the access point includes: when the TTG field is the third value, receiving, by the station, the fourth frame sent by the access point; or when the TTG field is the fourth value, receiving, by the station, the fifth frame sent by the access point.

In an implementation of the seventh aspect and the eighth aspect, the sending, by a station, a third frame to an access point, where the third frame carries first duration and a TTG field includes: sending, by the station, a last frame in the TXOP held by the station to the access point, where the last frame carries the first duration and the TTG field. The TTG field is carried in the last frame, to help the STA complete transmission of the STA, and a third-party STA is in an awake state when the AP holds the TXOP.

In an implementation of the seventh aspect and the eighth aspect, the sending, by a station, a third frame includes: sending, by the station, a contention free end CF-End-X frame, where the CF-End-X frame carries the second duration, and the CF-End-X frame is used to indicate that data transmission of the station at the TXOP held by the station ends. The CF-End-X frame helps determine TXOP handover, and avoid a transmission fault.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show some embodiments of the present invention, and a person of ordinary skill in the art may still derive other drawings from these accompanying drawings without creative efforts.

DESCRIPTION OF EMBODIMENTS

Figure 1:
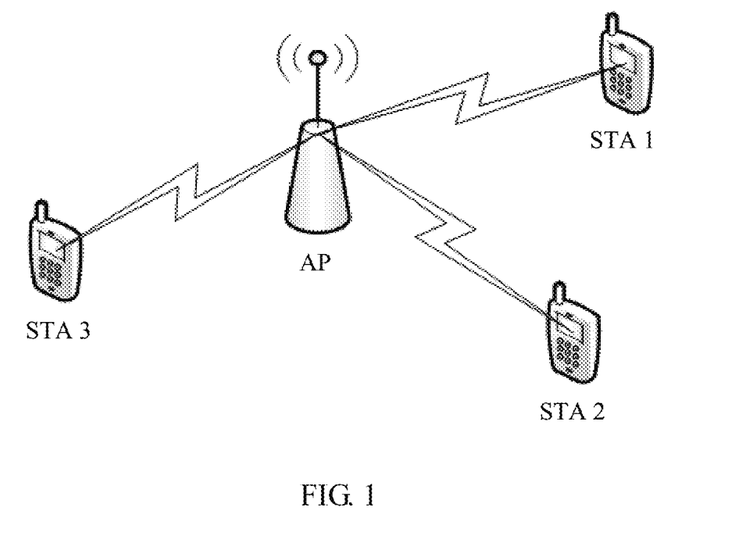
FIG. 1 is a schematic diagram of a WLAN deployment scenario.

FIG. 1 is a schematic diagram of a WLAN deployment scenario. Both an AP and a STA need to be a TXOP holder through contention. A purpose of a transmission opportunity control method provided in the embodiments of the present invention is to increase an opportunity for holding a TXOP by the AP, so that the AP has more opportunities to schedule each STA, and resource utilization is improved.

The following describes the technical solutions in the embodiments of the present invention with reference to the accompanying drawings in the embodiments of the present invention.

Figure 2:
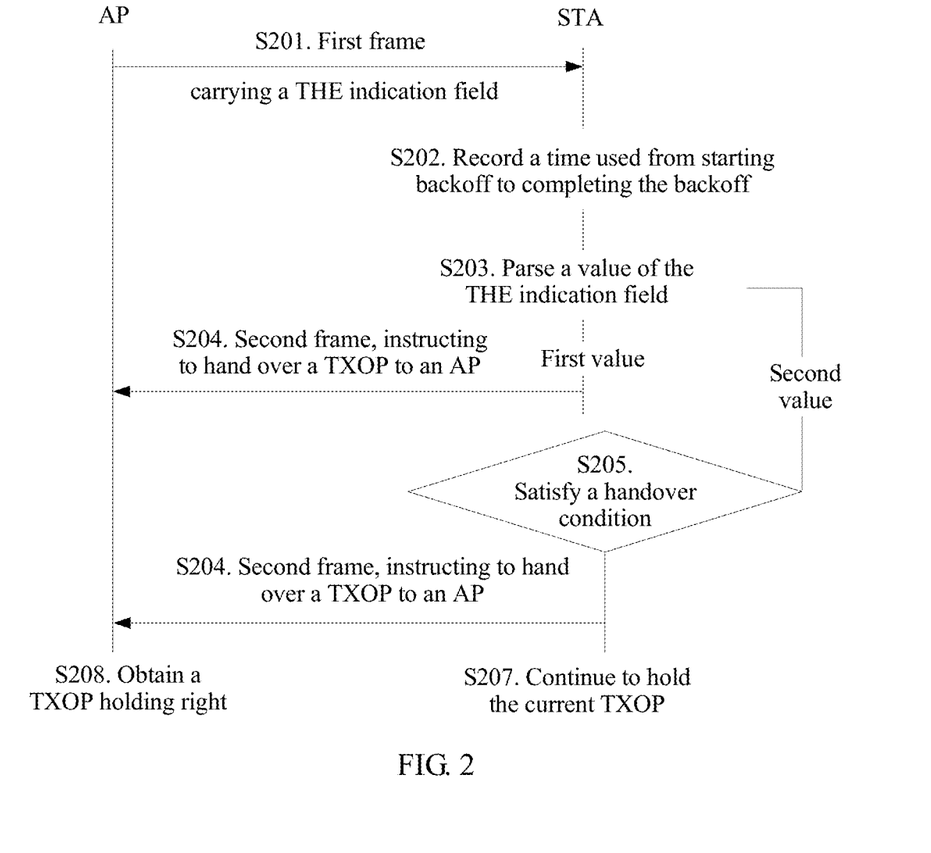
FIG. 2 is a flowchart of a transmission opportunity control method according to an embodiment of this application.

FIG. 2 is a transmission opportunity control method, including the following steps:

S201. An AP sends a first frame carrying a TXOP handover enforcement (TXOP Handover Enforcement, THE) indication field.

In some embodiments, the first frame may be a beacon frame (Beacon).

Further, the AP may send the beacon frame carrying the THE indication field to a STA within a beacon frame interval (Beacon Interval), where the beacon frame instructs the STA in the beacon frame interval to hand over a TXOP.

In some embodiments, a value of the THE indication field is a first value or a second value. The first value (for example, 1) instructs a STA that has accessed a channel to hand over a held TXOP to the AP, and the second value (for example, 0) instructs the STA that has accessed the channel to hand over the held TXOP to the AP when a handover condition is satisfied. That is, the first value instructs the STA to hand over the TXOP unconditionally, and the second value instructs the STA to determine, based on a condition, whether to hand over the TXOP. The AP may set a value of the THE indication field based on a requirement and a network status. For example, if a quantity of accessed STAs is greater than a preset value, and the AP needs to schedule a plurality of STAs, the AP may set the THE indication field to the first value.

S202. A STA successfully accesses a channel after completing backoff, and records a time used from starting the backoff to completing the backoff.

Figure 3:
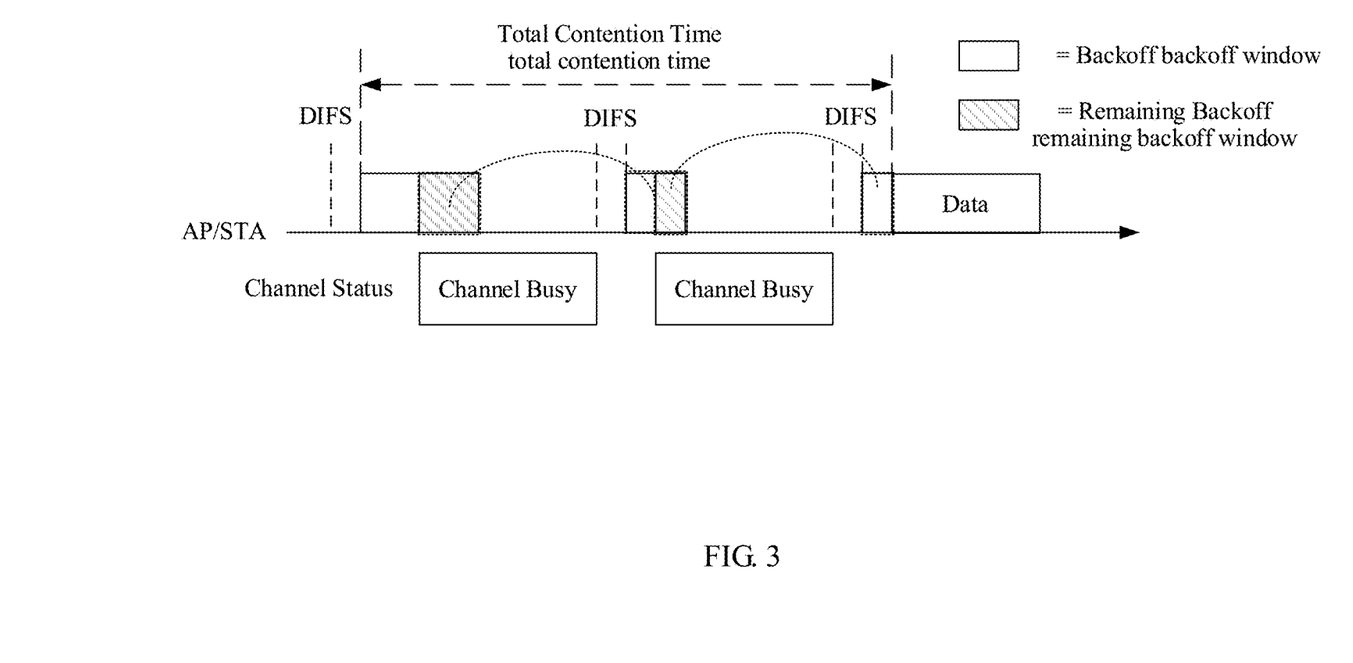
FIG. 3 is a flowchart of accessing a channel and sending data by a STA in the 802.11 standard.

FIG. 3 is a flowchart in which a STA starts backoff after sensing a channel, completes the backoff, accesses the channel, and sends data in the current 802.11 standard series. Specifically, after the STA senses that the channel is continuously in an idle state in a distributed inter-frame spacing (Distributed Inter Frame Space, DIFS) (DIFS=34 µs), the STA starts to randomly back off. The STA randomly selects a backoff window. The backoff window is an integer multiple of a basic time window: a Timeslot (aTimeslot=9 µs), and a minimum of the backoff window may be 0. If a time in which the channel remains idle exceeds a Timeslot, the backoff window is decreased by 1. If it finds that the channel is busy, the backoff is suspended until the channel is idle again. When the backoff window is decreased to 0, contention succeeds, and data is sent.

S203. The STA parses a value of the THE indication field after receiving the first frame, and if the THE indication field is a first value, S204 is performed, or if the THE indication field is a second value, S205 is performed.

It should be noted that S201 needs to be performed before S203 in this embodiment, but an execution sequence between S201 and S202 and an execution sequence between S202 and S203 are not limited to the sequence shown in FIG. 2.

S204. The STA sends a second frame to the AP, where the second frame instructs to hand over a TXOP to the AP.

S205. The STA determines whether a handover condition is satisfied, and if the handover condition is satisfied, S206 is performed, or if the handover condition is not satisfied, S207 is performed.

In some embodiments, the handover condition is that a time used by the STA to obtain the channel through contention is greater than a handover threshold. The handover threshold is a contention time that is provided by the access point for the station and that is used to contend for the channel. STAs may contend for the channel within the contention time, and cannot contend for the channel after the time expires. For example, the handover threshold is an average value of time periods used by the STA in previous five times of channel contention.

In some embodiments, the AP may determine the handover threshold based on a network status. For example, a network load amount, a quantity of accessed STAs, an average quantity of times of backoff collision between stations, or the like may be used as a basis for determining the handover threshold by the AP. Further, the AP may further adjust a value of the handover threshold based on a value of the network status.

In some embodiments, the handover threshold may be carried in a management frame, a control frame, or a data frame sent by the AP to the STA.

S206. The STA sends a second frame to the AP, where the second frame instructs to hand over the TXOP to the AP.

In some embodiments, the second frame in this embodiment may be a management frame, a control frame, or a data frame that carries TXOP handover information, or may be a newly defined frame different from that in the prior art.

S207. The STA continues to hold the current TXOP.

S208. The AP obtains a TXOP holding right, and performs downlink multi-STA data transmission, sends a trigger frame to trigger a random access, performs uplink multi-STA transmission, or the like at the TXOP.

Figure 4:
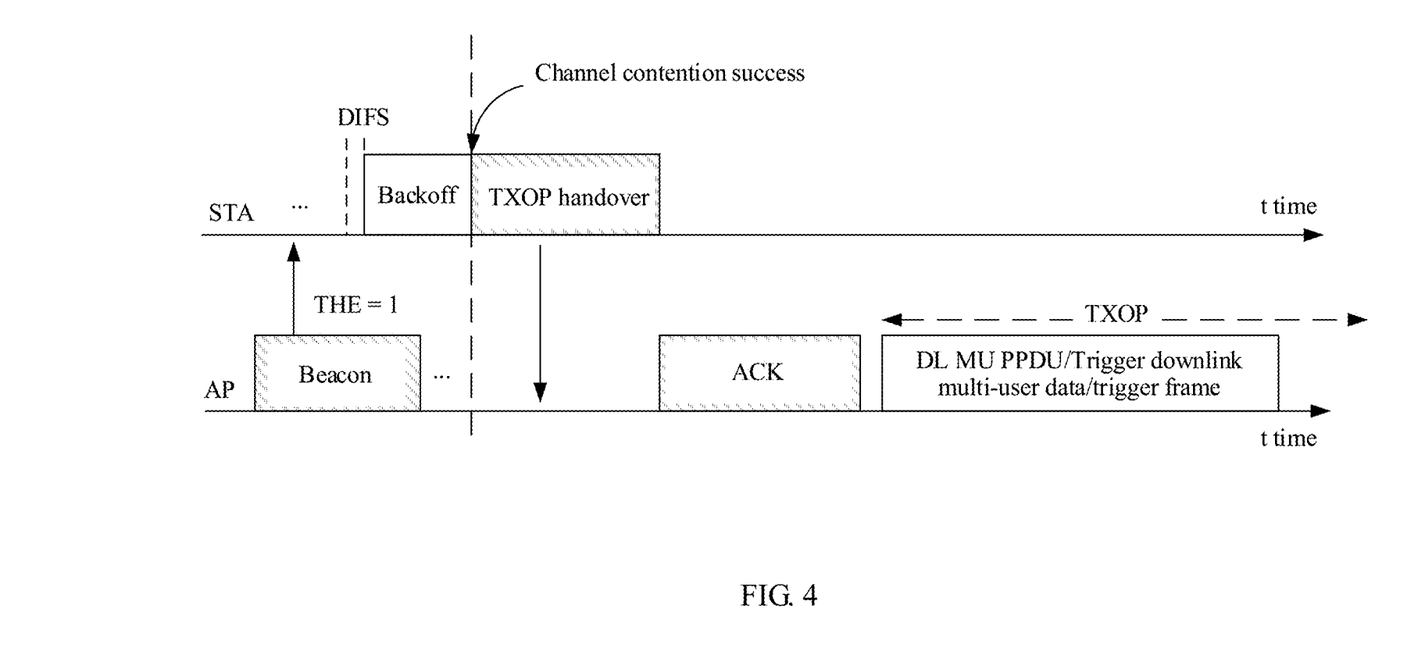
FIG. 4 is a schematic diagram of frame interaction in the method shown in FIG. 2.

FIG. 4 is a schematic diagram of frame interaction in the method shown in FIG. 2. After receiving the second frame, the AP may further feed back an ACK to the STA. In addition to a function that has been defined in the prior art, the ACK in this embodiment is further used to notify the STA that the AP starts to hold the TXOP.

It can be learned that in the method in this embodiment, the STA can hand over the held TXOP to the AP, and therefore the AP can be a TXOP holder through the TXOP handover even if the AP fails to obtain the channel through contention. Therefore, a probability of holding a TXOP by the AP is improved, a probability of scheduling a STA by the AP is improved, and system resource utilization is improved.

Figure 5:
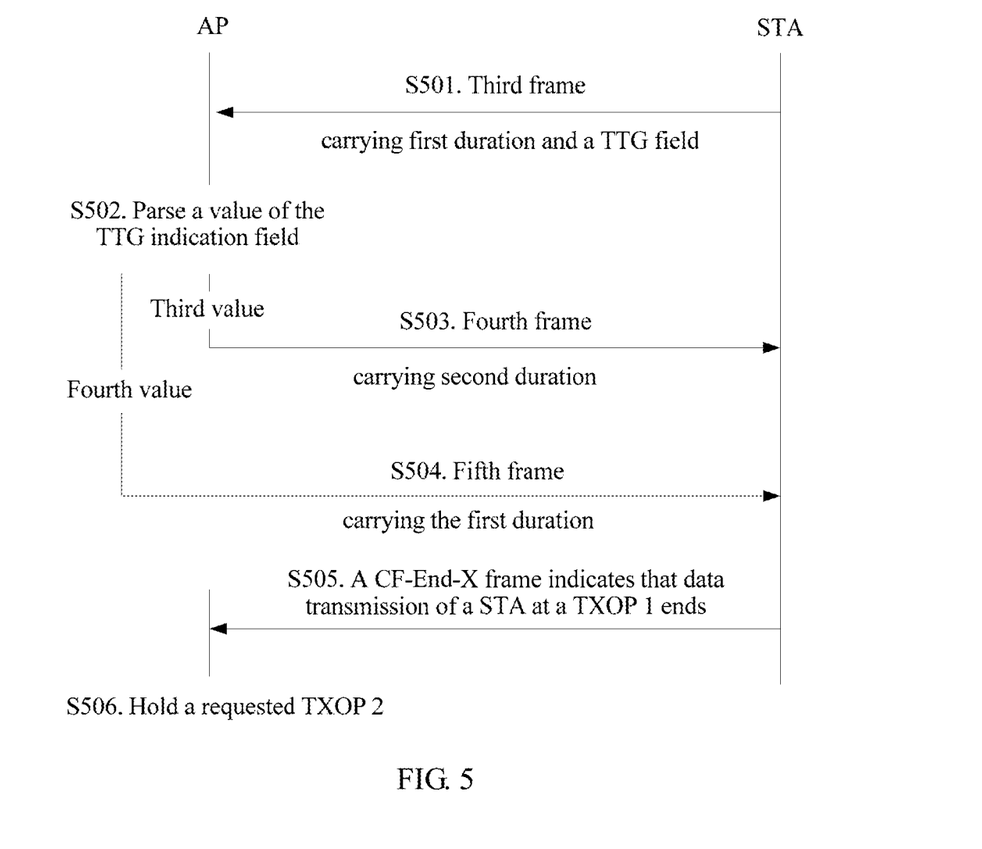
FIG. 5 is a flowchart of another transmission opportunity control method according to an embodiment of this application.

FIG. 5 is another transmission opportunity control method according to an embodiment of this application. A difference from the method shown in FIG. 4 is that after a STA completes holding of a TXOP 1, an AP can hold a TXOP 2, and the new TXOP holder may break through a limit of an original TXOP length.

The method shown in FIG. 5 includes the following steps.

S501. After a STA successfully accesses a channel, the STA sends a third frame to an AP, where the third frame carries first duration and a TXOP transfer grant (TXOP Transfer Grant, TTG) field.

The first duration is determined by the STA based on a TXOP held by the STA. Specifically, a network allocation vector (Network Allocation Vector, NAV) in the third frame is set to the first duration. For a specific manner of setting the NAV, refer to the prior art. Details are not described herein.

In some embodiments, the TTG field is a third value or a fourth value. The third value (for example, 1) is used to indicate that TXOP handover is allowed, and the fourth value (for example, 0) is used to indicate that TXOP handover is not allowed. The STA may set a value of the TTG field based on a requirement. A bit size occupied by the TTG field may be determined based on an actual requirement. In this embodiment, to reduce resource overheads, the TTG field is defined as 1 bit.

S502. The AP parses a value of the TTG field, and if the TTG field is a third value, S503 is performed, or if the TTG field is a fourth value, S504 is performed.

S503. The AP sends a fourth frame to the STA that has accessed the channel, where the fourth frame carries second duration, and the second duration is longer than the first duration.

The second duration is determined based on a TXOP requested by the AP. The TXOP requested by the AP is obtained by extending the TXOP held by the STA by a preset time. Specifically, an NAV in the fourth frame is set to the second duration.

S504. The AP sends a fifth frame to the STA that has accessed the channel, where the fifth frame carries the first duration.

S505. The STA sends a contention free end (Contention Free End, CF-End-X) frame to the AP, where the CF-End-X frame carries the second duration, and the CF-End-X frame is used to indicate that data transmission of the STA at a TXOP 1 ends.

A purpose of S505 is to notify the AP that transmission of the STA at the TXOP 1 ends, and the AP may start to hold a TXOP 2. Therefore, a communication conflict can be avoided.

S506. The AP holds a requested TXOP 2.

S507 (not shown in FIG. 5). A third-party device (for example, another STA) that can identify a TTG field listens to a frame exchanged between the AP and the STA, and before listening and detecting a frame that carries TTG=1, the third-party device sets an NAV of the third-party device based on relatively long duration, so that the third-party device keeps silent during duration corresponding to the NAV. Once the third-party device listens and detects the frame that carries TTG=1, it indicates that the AP starts to hold the TXOP 2, and the third-party device stops being silent, and prepares to cooperate with the AP in scheduling.

A third-party device that cannot identify a TTG field directly sets an NAV of the third-party device based on relatively long duration.

Figure 6:
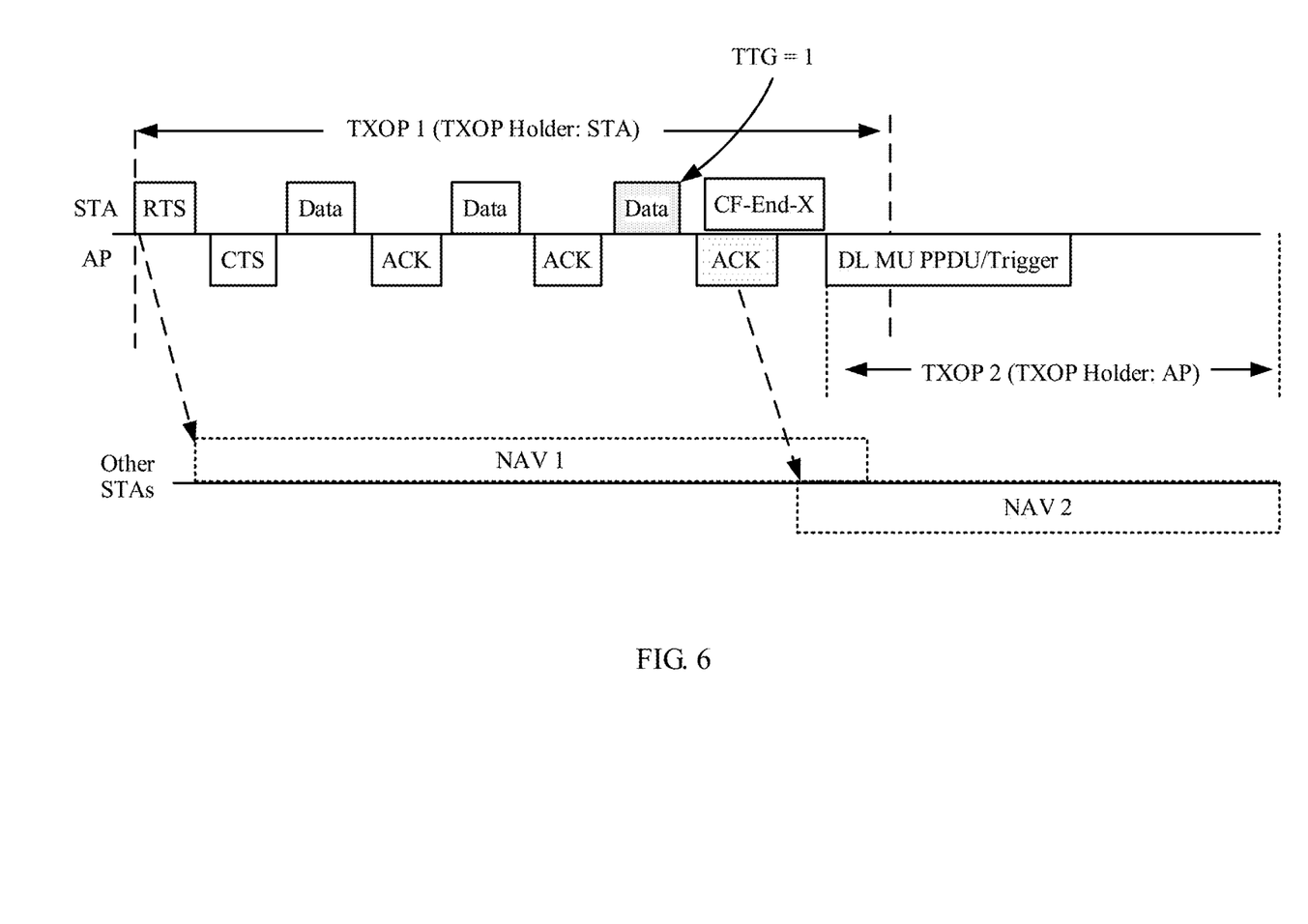
FIG. 6 is a schematic diagram of frame interaction in the method shown in FIG. 5.

The following is described with an example based on the foregoing process. As shown in FIG. 6, after successfully accessing the channel, the STA sends a control frame, a data frame, or a management frame to the AP at the TXOP 1, and TTG=1 may be carried in any one of the foregoing frames. Optionally, to ensure that the STA can complete transmission, and the third-party STA that can identify a TTG field stops being silent at the TXOP 2, so as to facilitate scheduling by the AP, the AP needs to perform, at a moment close to an end of the TXOP 1 as much as possible, duration setting to extend the TXOP 1 to the TXOP 2, so that the third-party STA correctly understands that the TXOP 2 is extension of the TXOP 1, and needs to keep awake at the TXOP 2. Therefore, as shown in FIG. 6, TTG=1 is carried in a last frame (data of a deep color) sent by the STA to the AP. That is, in the last frame sent by the STA to the AP, a value of a TTG field is 1, and an NAV is the second duration. In another frame sent by the STA to the AP, TTG=0, or a TTG field is carried, and an NAV is the first duration.

If a frame received by the AP carries TTG=0, the AP sends a feedback frame to the STA according to a rule of an existing standard. For example, a CTS is fed back after an RTS is received, where an NAV is the first duration. If a frame received by the AP carries TTG=1, an NAV in a frame fed back by the AP to the STA is the second duration. After feeding back the frame that carries the second duration, the AP holds the TXOP 2. The AP may determine a length of the TXOP 2 based on a status of the AP and a status of a whole BSS.

It can be learned that in the method in this embodiment, after the STA completes transmission at the TXOP 1, a resource is not released, but a TXOP 1 holding right is released, so that the AP is a holder of the TXOP 2, and continues to access the resource. Therefore, the AP does not need to contend for a channel again, a probability of scheduling a STA by the AP can be improved, and resource utilization can be improved.

Figure 7:
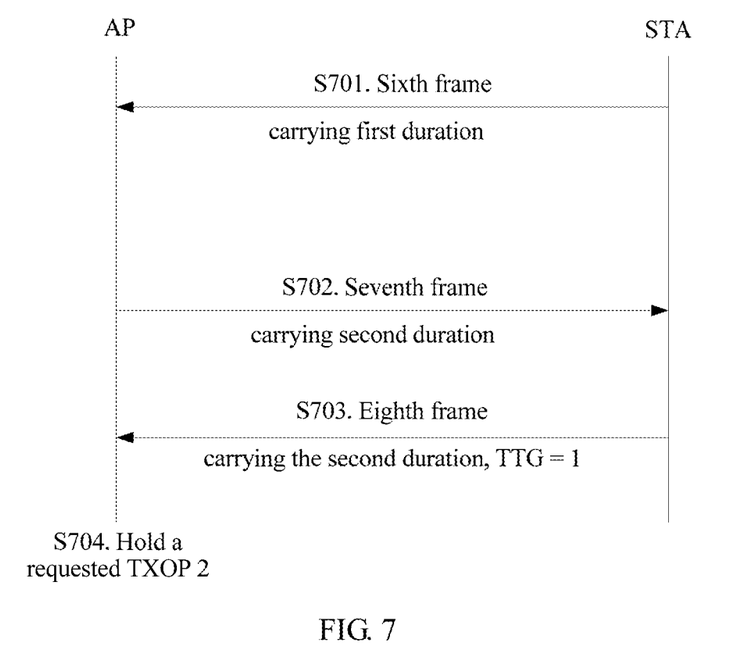
FIG. 7 is a flowchart of another transmission opportunity control method according to an embodiment of this application.

FIG. 7 is another transmission opportunity control method according to an embodiment, and the method includes the following steps:

S701. After successfully contending for a channel, a STA sends a sixth frame to an AP at a TXOP 1, where the sixth frame carries first duration.

S702. The AP sends a seventh frame to the STA, where the seventh frame carries second duration.

S703. The STA sends an eighth frame to the AP, where the eighth frame carries the second duration and a TTG field, and the TTG field is 1.

S704. The AP holds a TXOP 2.

Figure 8:
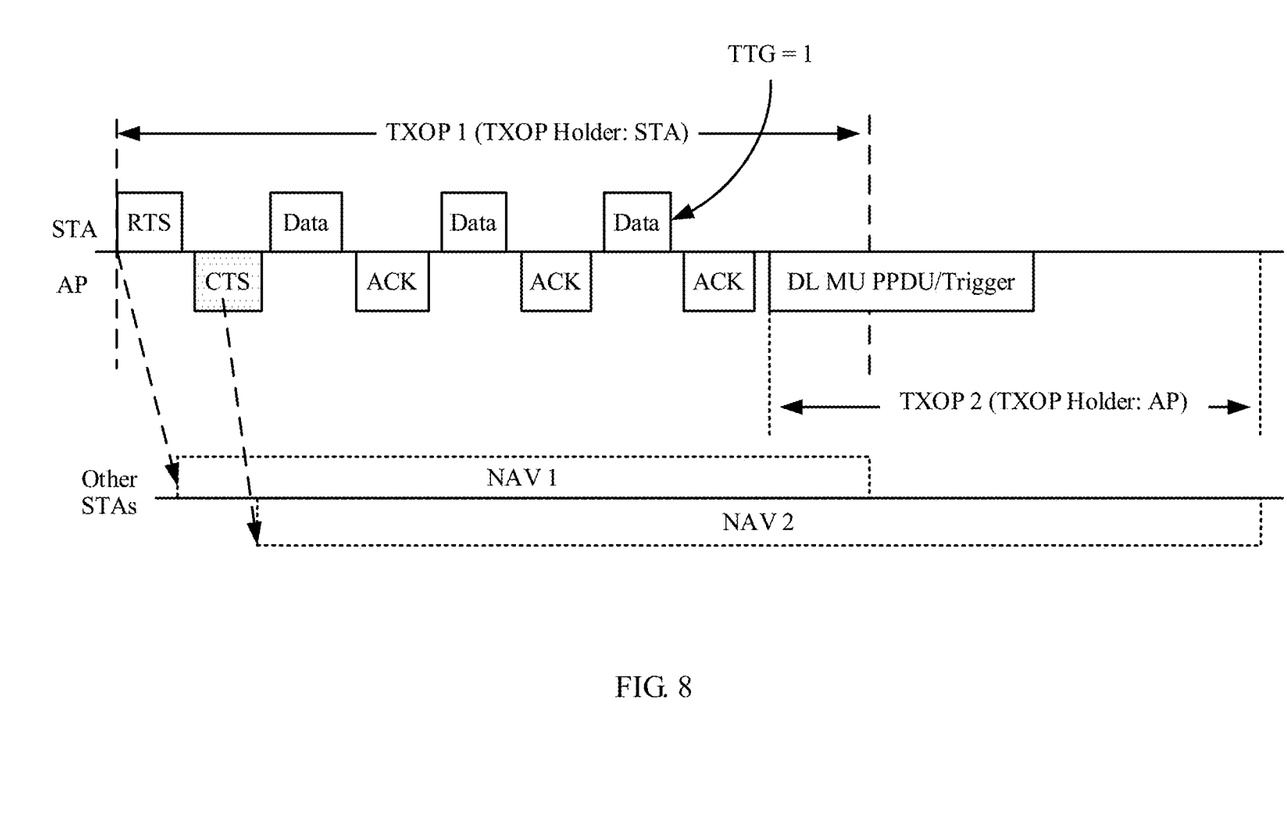
FIG. 8 is a schematic diagram of frame interaction in the method shown in FIG. 7.

For example, as shown in FIG. 8, the STA sends an RTS. For a specific form of the RTS, refer to the prior art. The AP replies with a CTS. A difference from a CTS defined in the prior art is that the CTS carries the second duration. Last data sent by the STA carries TTG=1, and the AP starts to hold the TXOP 2.

In the method in this embodiment, resource utilization of a WLAN system can be improved.

Figure 9:
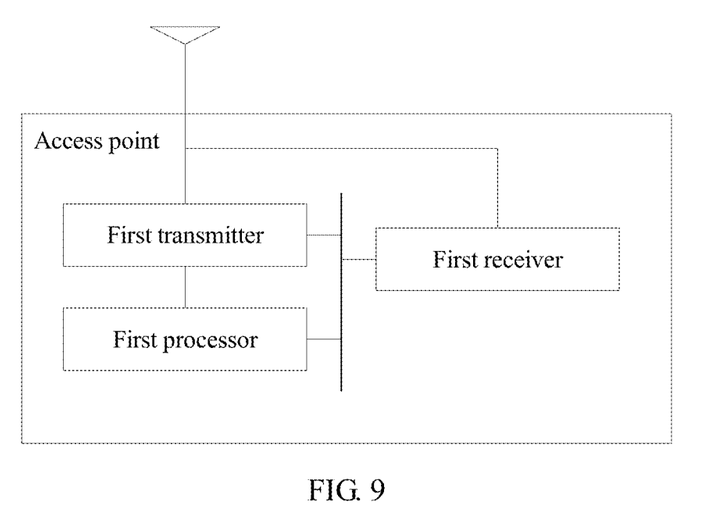
FIG. 9 is a schematic structural diagram of an access point according to an embodiment of this application.

FIG. 9 is a schematic structural diagram of an access point shown in FIG. 2, and the access point includes a first transmitter, a first processor, and a first receiver.

The first transmitter is configured to send a first frame, the first receiver is configured to receive a second frame sent by a station that has accessed a channel, and the first processor is configured to: determine a handover threshold based on a network status, and send the handover threshold to the station. For specific forms of the first frame and the second frame, a specific function implementation of the access point, and the like, refer to FIG. 2.

A structure of an access point shown in FIG. 5 includes a second receiver, a second transmitter, and a second processor. The second receiver is configured to receive a third frame. The second transmitter is configured to: when a TTG field is a third value, send a fourth frame to a station that has accessed a channel; and when the TTG field is a fourth value, send a fifth frame to the station that has accessed the channel. The second processor is configured to: after the second transmitter sends the fourth frame to the station that has accessed the channel, hold a TXOP requested by the access point.

In this embodiment, for some forms of the third frame, the fourth frame, and the fifth frame and a function implementation procedure of the access point, refer to FIG. 5. Details are not described herein.

A structure of a station shown in FIG. 2 includes a third receiver, a third transmitter, and a third processor. The third receiver is configured to receive a first frame, the third transmitter is configured to send a second frame, and the third processor is configured to: implement a determining process, and hold a current TXOP.

A structure of a station shown in FIG. 5 includes a fourth transmitter and a fourth receiver. The fourth transmitter is configured to send a third frame and a CF-End-X, and the fourth receiver is configured to receive a fourth frame or a fifth frame.

An access point shown in FIG. 7 includes a fifth receiver, a fifth transmitter, and a fifth processor. The fifth receiver is configured to receive a sixth frame and an eighth frame, the fifth transmitter is configured to send a seventh frame, and the fifth processor is configured to hold a TXOP 2. A station shown in FIG. 7 includes a sixth transmitter and a sixth receiver. The sixth transmitter is configured to send the sixth frame and the eighth frame, and the sixth receiver is configured to receive the seventh frame.

The foregoing access point and station can implement a change of a TXOP holder from the station to the access point through frame interaction, so as to improve a probability of scheduling a STA by the access point, and improve resource utilization.

The embodiments in the present disclosure are all described in a progressive manner, for same or similar parts in the embodiments, reference may be made to these embodiments, and each embodiment focuses on a difference from other embodiments.

What is claimed is:

1. An apparatus for transmission opportunity (TXOP) control, applied in a station in a wireless local area network (WLAN), the apparatus comprising:
    a receiver configured to receive a first frame from an access point, wherein the first frame carries a TXOP handover enforcement indication field that can be either a first value or a second value, wherein the first value instructs the station that has accessed a channel to hand over a held TXOP to the access point, and the second value instructs the station that has accessed the channel to hand over the held TXOP to the access point when a handover condition is satisfied; and
    a transmitter, configured to, when the indication field is the first value, send a second frame to the access point, wherein the second frame indicates that the station can hand over the held TXOP to the access point.

2. The apparatus according to claim 1, further comprising:
    a processor configured to access the channel after the station completes backoff, and to obtain the held TXOP.

3. The apparatus according to claim 1, wherein the first frame is a beacon frame.

4. The apparatus according to claim 1, wherein the second frame is a management frame, a control frame, or a data frame carrying TXOP handover information.

5. The apparatus according to claim 1, wherein the receiver is further configured to receive an ACK signal in response to the second frame.

6. An apparatus for transmission opportunity (TXOP) control, applied in an access point in a wireless local area network (WLAN), the apparatus comprising:
    a processor, configured to generate a first frame that carries a TXOP handover enforcement indication field that can be either a first value or a second value, wherein the first value instructs a station that has accessed a channel to hand over a held TXOP to the access point, and the second value instructs the station that has accessed the channel to hand over the held TXOP to the access point when a handover condition is satisfied;
    a transmitter, configured to send the first frame to the station;
    a receiver, configured to receive a second frame from the station, wherein the second frame indicates that the station can hand over the held TXOP to the access point.

7. The apparatus according to claim 6, wherein
    the transmitter is further configured to send downlink multi-user data in the held TXOP; or,
    the transmitter is further configured to send a trigger frame to trigger a random access, or to perform uplink multi-station transmission in the held TXOP.

8. The apparatus according to claim 6, wherein the first frame is a beacon frame.

9. The apparatus according to claim 6, wherein the second frame is a management frame, a control frame, or a data frame carrying TXOP handover information.

10. The apparatus according to claim 6, wherein the transmitter is further configured to transmit an ACK signal in response to the second frame.

11. The apparatus according to claim 6, wherein the second station is also an access point station.

12. A transmission opportunity control method, comprising:
    generating by an access point, a first frame that carries a TXOP handover enforcement indication field that can be either a first value or a second value, wherein the first value instructs a station that has accessed a channel to hand over a held TXOP to the access point, and the second value instructs the station that has accessed the channel to hand over the held TXOP to the access point when a handover condition is satisfied;
    sending by the access point, the first frame to the station;
    receiving, by the access point, a second frame from the station, wherein the second frame indicates that the second station can hand over the held TXOP to the access point.

13. The transmission opportunity control method according to claim 12, further comprising
    sending, by the access point, downlink multi-user data in the held TXOP;
    or
    sending, by the access point a trigger frame to trigger a random access, or to perform uplink multi-station transmission in the held TXOP.

14. The transmission opportunity control method according to claim 12, wherein the first frame is a beacon frame.

15. The transmission opportunity control method according to claim 12, wherein the second frame is a management frame, a control frame, or a data frame carrying TXOP handover information.

16. The transmission opportunity control method according to claim 12, wherein the method further comprises,
    sending, by the access point, an ACK signal in response to the second frame.

* * * * *

UNITED STATES PATENT AND TRADEMARK OFFICE
CERTIFICATE OF CORRECTION

PATENT NO. : 11,683,732 B2
APPLICATION NO. : 16/842792
DATED : June 20, 2023
INVENTOR(S) : Hongjia Su et al.

It is certified that error appears in the above-identified patent and that said Letters Patent is hereby corrected as shown below:

In the Claims

In Column 10, Line 25, in Claim 11, delete "second station" and insert -- station --.

In Column 10, Line 36, in Claim 12, delete "point," and insert -- point --.

Signed and Sealed this
Fifteenth Day of August, 2023

Katherine Kelly Vidal
*Director of the United States Patent and Trademark Office*